US012664741B2

(12) United States Patent
Hwang et al.

(10) Patent No.: US 12,664,741 B2
(45) Date of Patent: Jun. 23, 2026

(54) MULTI-FRAME CAPTURE SYSTEM FOR ENHANCED VISUAL REASONING IN AUGMENTED REALITY DEVICES

(71) Applicant: Snap Inc., Santa Monica, CA (US)

(72) Inventors: Viktoria Hwang, Monrovia, CA (US); Mitchell Kuppersmith, Los Angeles, CA (US); Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 135 days.

(21) Appl. No.: 18/824,621

(22) Filed: Sep. 4, 2024

(65) Prior Publication Data

US 2026/0065602 A1     Mar. 5, 2026

(51) Int. Cl.
*G06T 19/00* (2011.01)
*G06V 40/10* (2022.01)
*G10L 15/26* (2006.01)

(52) U.S. Cl.
CPC .......... *G06T 19/006* (2013.01); *G06V 40/107* (2022.01); *G10L 15/26* (2013.01)

(58) Field of Classification Search
CPC ...... G06T 19/006; G06V 40/107; G10L 15/26
USPC .......................................... 345/633
See application file for complete search history.

(56) References Cited

U.S. PATENT DOCUMENTS 11,425,412 B1 * 8/2022 Gigliotti ................ H04N 19/17
2020/0341546 A1  10/2020 Yuan et al.

2023/0068798 A1 *  3/2023 Etchart ..................... G06T 7/74
2023/0176658 A1   6/2023 Lee et al.
2023/0410833 A1 * 12/2023 Sundaram ............... G10L 15/16
2025/0191307 A1 *  6/2025 Chakraborty ........... G06F 3/011
2025/0278573 A1 *  9/2025 Cambronero Sánchez ..................
                                                        G06F 40/40
2025/0278616 A1 *  9/2025 Wang ................... G06N 3/0495

OTHER PUBLICATIONS

"International Application Serial No. PCT US2025 041102, International Search Report mailed Nov. 18, 2025", 3 pgs.
"International Application Serial No. PCT US2025 041102, Written Opinion mailed Nov. 18, 2025", 8 pgs.
Zedian, Shao, "Refusing Safe Prompts for Multi-modal Large Language Models", Arxiv.Org, Cornell University Library, 201 Olin Library Cornell University Ithaca, NY, Jul. 12, 2024, 27 pgs.

* cited by examiner

*Primary Examiner* — Jin Ge
(74) *Attorney, Agent, or Firm* — Schwegman Lundberg & Woessner, P.A.

(57) ABSTRACT

A device and system for visual reasoning in augmented reality environments employs adaptive multi-frame capture triggered by detection of user speech. Upon detecting speech, the device or system captures image frames at an initial frame capture rate, increasing capture frequency when a hand is detected in a captured image. Timestamped frames and transcribed speech form a prompt for a multimodal large language model, which extracts relevant details with constrained output. A separate language model then generates a final response. This two-stage approach optimizes processing efficiency and accuracy while preserving privacy by limiting continuous visual data collection. The system enables more natural and context-aware interactions in AR settings without complex gesture recognition algorithms.

20 Claims, 10 Drawing Sheets

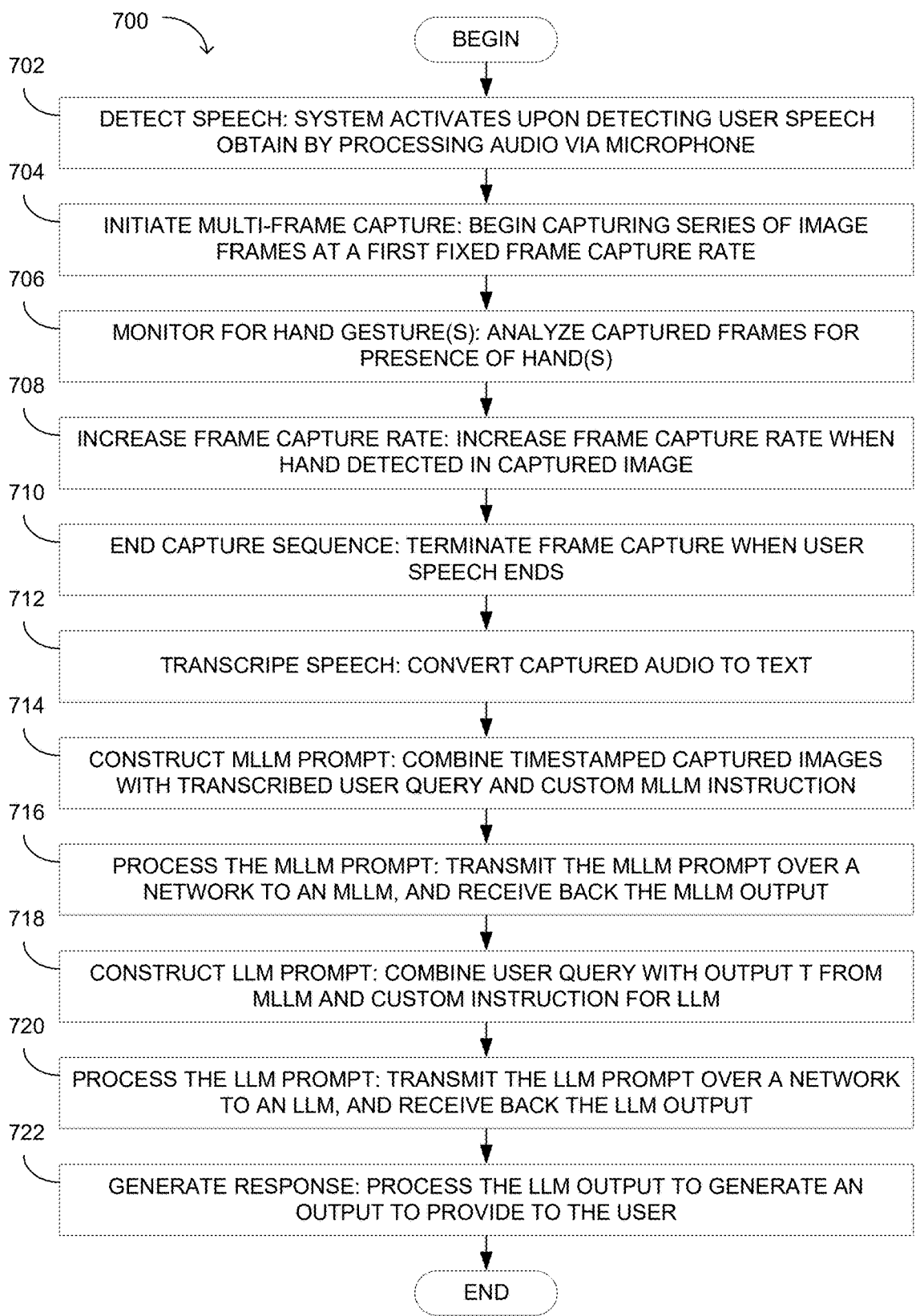

700

BEGIN

702
DETECT SPEECH: SYSTEM ACTIVATES UPON DETECTING USER SPEECH OBTAIN BY PROCESSING AUDIO VIA MICROPHONE

704
INITIATE MULTI-FRAME CAPTURE: BEGIN CAPTURING SERIES OF IMAGE FRAMES AT A FIRST FIXED FRAME CAPTURE RATE

706
MONITOR FOR HAND GESTURE(S): ANALYZE CAPTURED FRAMES FOR PRESENCE OF HAND(S)

708
INCREASE FRAME CAPTURE RATE: INCREASE FRAME CAPTURE RATE WHEN HAND DETECTED IN CAPTURED IMAGE

710
END CAPTURE SEQUENCE: TERMINATE FRAME CAPTURE WHEN USER SPEECH ENDS

712
TRANSCRIPE SPEECH: CONVERT CAPTURED AUDIO TO TEXT

714
CONSTRUCT MLLM PROMPT: COMBINE TIMESTAMPED CAPTURED IMAGES WITH TRANSCRIBED USER QUERY AND CUSTOM MLLM INSTRUCTION

716
PROCESS THE MLLM PROMPT: TRANSMIT THE MLLM PROMPT OVER A NETWORK TO AN MLLM, AND RECEIVE BACK THE MLLM OUTPUT

718
CONSTRUCT LLM PROMPT: COMBINE USER QUERY WITH OUTPUT T FROM MLLM AND CUSTOM INSTRUCTION FOR LLM

720
PROCESS THE LLM PROMPT: TRANSMIT THE LLM PROMPT OVER A NETWORK TO AN LLM, AND RECEIVE BACK THE LLM OUTPUT

722
GENERATE RESPONSE: PROCESS THE LLM OUTPUT TO GENERATE AN OUTPUT TO PROVIDE TO THE USER

END

FIG. 7

MULTI-FRAME CAPTURE SYSTEM FOR ENHANCED VISUAL REASONING IN AUGMENTED REALITY DEVICES

TECHNICAL FIELD

The present disclosure relates generally to visual reasoning systems for augmented reality (AR) devices, and more specifically to multi-frame capture and processing techniques for enhancing natural interactions in AR environments. This technology enables more intuitive and accurate visual queries through the integration of speech, gestures, and head movements, facilitating seamless communication between users and digital assistants, specifically, artificial intelligence (AI) based assistants, in mixed reality settings. The field encompasses AR spectacles, large language models (LLMs), multimodal large language models (MLLMs), computer vision, speech processing, and adaptive frame capture systems designed to improve visual reasoning and user experience in AR applications.

BACKGROUND

Augmented reality (AR) technology has rapidly evolved in recent years, offering new ways for users to interact with digital information overlaid on the physical world. AR devices, particularly wearable glasses or headsets, have become increasingly sophisticated, integrating various sensors and input mechanisms to enhance user experiences. In the realm of human-computer interaction, visual reasoning systems have emerged as a powerful tool for interpreting and responding to user queries about their surroundings. These systems typically rely on computer vision algorithms and natural language processing to understand and process user inputs.

Traditionally, visual reasoning interfaces have often relied on single-frame image capture methods, where users need to manually trigger the capture of a specific moment or scene. For example, a user might need to manually press a button or make a specific gesture to capture an image of an object they wish to inquire about, interrupting the natural flow of their interaction with the AR environment. This approach, while functional, can sometimes feel unnatural or disconnected from the fluid, real-time nature of human perception and inquiry.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 7 is a flowchart illustrating the steps of the multi-frame capture and processing method, according to some embodiments.

DETAILED DESCRIPTION

The present disclosure describes techniques for enhancing visual reasoning and user interactions through augmented reality (AR) devices, with a particular focus on multi-frame capture and processing techniques. By leveraging the capabilities of advanced sensor integration and multimodal large language models (MLLMs), the disclosed techniques create more intuitive, accurate, and context-aware user experiences for visual queries in AR environments. The following detailed description provides various embodiments of these systems and methods, including adaptive multi-frame capture, object (e.g., hand) recognition, speech processing, and multimodal input analysis for improved visual reasoning in AR applications.

Figure 1A:
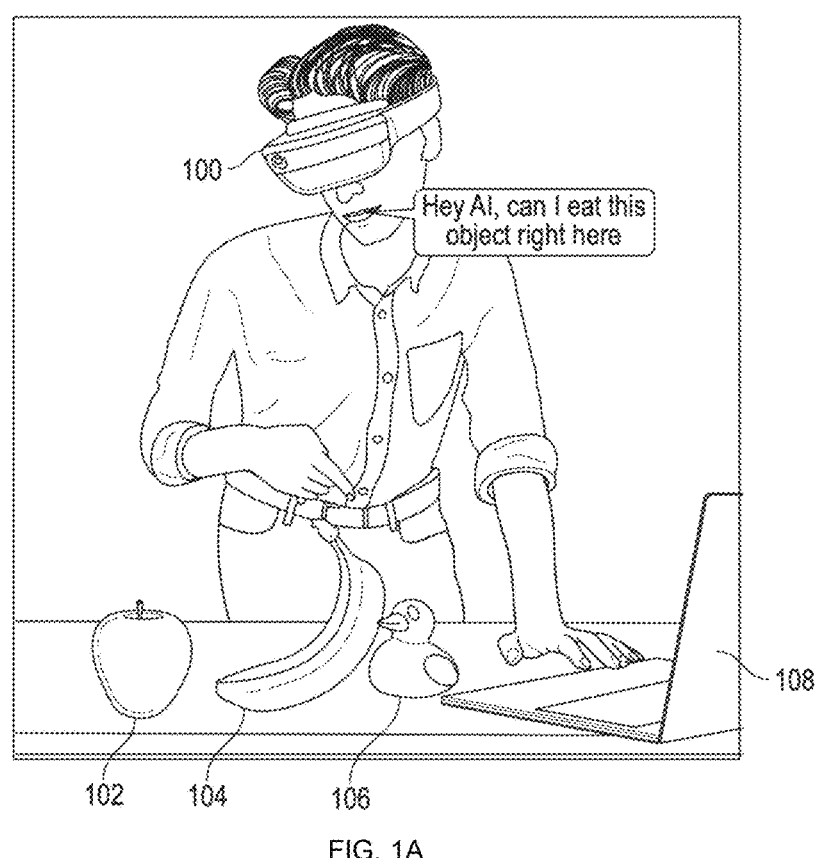
FIG. 1A illustrates a third-person view of a user wearing an augmented reality (AR) headset interacting with objects on a desk.

FIG. 1A illustrates a third-person view of a user wearing an AR headset 100 with multiple integrated components, including a display, microphone, speaker, and cameras. These components work together to enable AR experiences and visual reasoning capabilities. The scene depicts a desk with various objects: an apple 102, a banana 104, a rubber duck 106, and a laptop 108. This arrangement sets the stage for demonstrating the challenges in visual reasoning for AR systems.

Figure 1B:
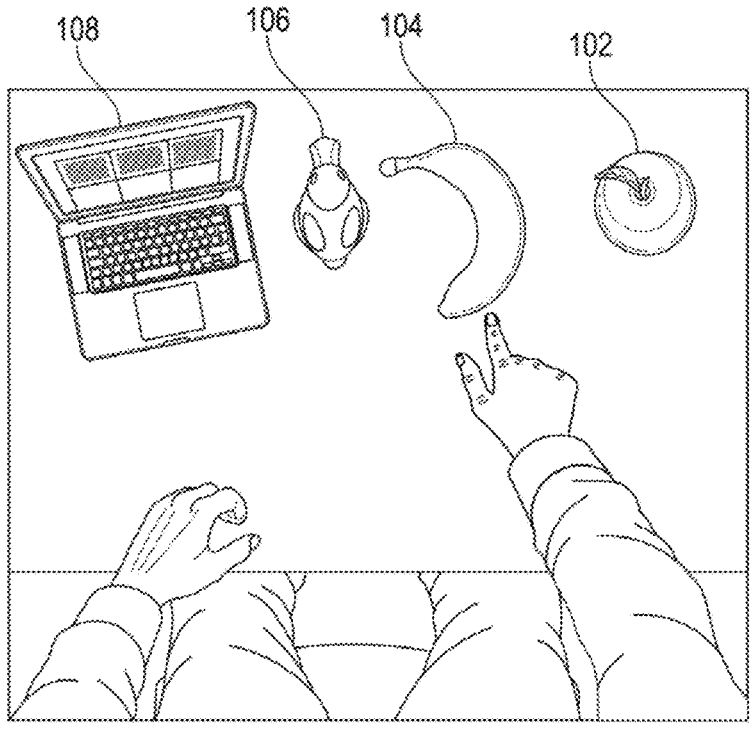
FIG. 1B illustrates a first-person view corresponding to the scene depicted in FIG. 1A.

FIG. 1B presents the first-person perspective of the AR headset wearer, corresponding to the scene in FIG. 1A. This first-person view emphasizes the limited field of vision experienced by the user and highlights the potential ambiguity in determining which object the user is referring to when using vague language like "this" or "this object." This perspective illustrates the challenges faced by the AR system or device in interpreting user queries.

Traditionally, visual reasoning interfaces have relied on single-frame image capture techniques, which often disrupt the natural flow of user interactions. For example, users might need to manually trigger image capture through a button press or specific gesture. This approach not only feels unnatural but also fails to capture valuable temporal information linking the visual scene with the user's query. The disconnect between image capture and query formulation can lead to misinterpretations and incorrect responses from the visual reasoning system. This problem is further described below in connection with FIG. 2.

Figure 2:
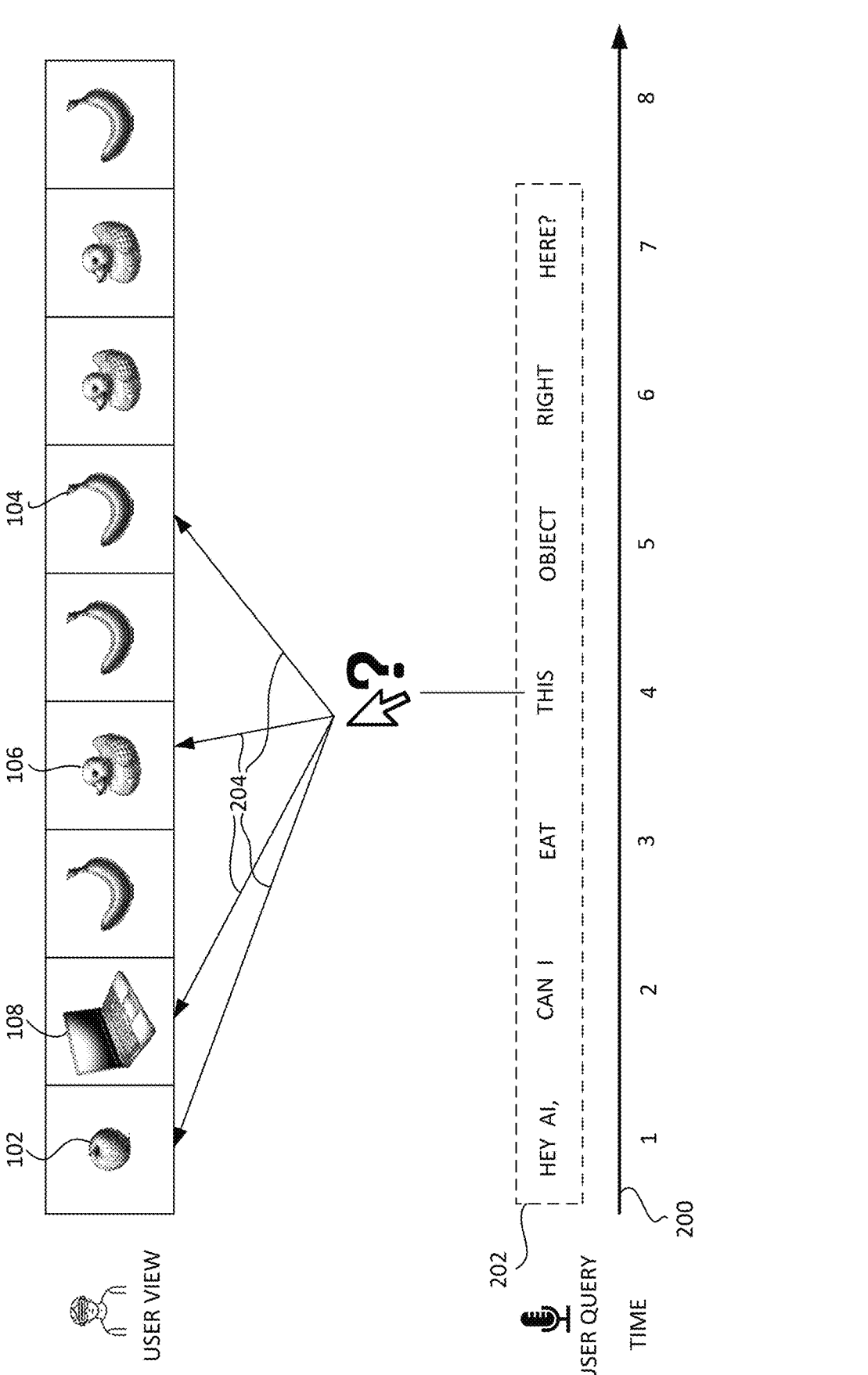
FIG. 2 is a timeline diagram illustrating the ambiguity problem in traditional single-frame capture systems for visual reasoning.

FIG. 2 illustrates a timeline 200, having arbitrary units of time represented by numbers one through eight, and demonstrates the continuous nature of speech and the challenge of correlating specific words in a user query 202 with the user's visual focus. As the user continuously rotates his head over time shifting the user's gaze between objects (apple 102, laptop 108, rubber duck 106, and banana 104), their query 202 "Hey AI, can I eat this object right here?" spans the entire timeline 200. This illustration highlights the difficulty in determining which specific moment or image should be analyzed in conjunction with the user's query.

The limitations of conventional single-frame capture systems are evident in two scenarios. First, capturing an image before the user speaks (e.g., prior to time, T=1) may miss important visual context. Second, capturing an image after the user speaks (e.g., subsequent to time, T=7) may not accurately represent their focus during the query. These limitations arise when the visual reasoning system forces sequential image and query capture, eliminating valuable contextual cues that could help determine the user's intent.

Even when simultaneous capture of image and user query is possible, the ambiguity persists. The arrows 204 in FIG. 2 illustrate how the word "this" in the user's query 202 could refer to any of the objects on the desk (apple 102, laptop 108, rubber duck 106, and banana 104). This ambiguity stems from the single-frame approach's lack of temporal context necessary to correlate the user's speech, head movements, and potential gestures with the objects in view.

Without the ability to correlate the timing of gestures, head movements, or changes in visual focus with the spoken query, the system lacks information for accurately interpreting the user's intent. This significantly reduces the system's ability to disambiguate between multiple objects or understand the specific context of the user's inquiry, potentially leading to misinterpretations or incorrect responses from the digital assistant.

In real-world scenarios, people interact with objects in their environment in natural and intuitive ways while inquiring about them. For instance, users often physically interact with objects of interest by picking them up and bringing them closer to examine or inquire about them. This behavior provides valuable context for understanding the user's intent when using AR devices. Consider a person grabbing a fruit from a bowl and holding it up while asking, "Is this ripe enough to cat?" This action of bringing the object closer to the AR device's camera provides a clear visual focus for the query, enhancing the system's ability to accurately interpret the user's intention.

People frequently use their hands to make specific gestures while asking questions about objects. The most common gesture is pointing, where a user extends their index finger towards the object of interest. For example, someone might point at a painting and ask, "Who is the artist of this piece?" Additionally, users may employ circling gestures, using their hand to outline or indicate a general area containing the object they're inquiring about. These hand movements serve as visual cues that complement the verbal query, helping to disambiguate the subject of interest and providing crucial information for the AR system to interpret the user's query accurately.

Even without explicit hand gestures, people tend to look in the direction of objects they're asking about. This head movement and gaze direction can provide crucial information about the subject of the query. For instance, a person might simply turn their head towards a building and ask, "When was this structure built?" without any accompanying hand gesture. The direction of the user's gaze can be a powerful indicator of their focus and intent, offering another layer of context for the AR system to consider when processing queries.

These observed behaviors offer significant clues for understanding user intent in AR environments. By capturing multiple frames over time, the system can correlate the user's speech with their physical interactions. This allows for a more accurate determination of which object is being referenced, especially when the query contains ambiguous terms like "this" or "that". The temporal correlation between speech and visual cues is crucial for resolving ambiguity in natural language queries, enabling the AR system to provide more accurate and contextually relevant responses.

The illustration in FIG. 2 effectively highlights the need for a more sophisticated approach to visual reasoning in AR environments. A multi-frame capture approach addresses the limitations of traditional single-frame methods by capturing and analyzing multiple frames over time, allowing the system to make inferences about the user's intent based on the correlation between their speech and visual cues. Consistent with some embodiments, the techniques set forth herein address the challenges of accurately interpreting user queries in AR environments by leveraging multiple timestamped frames and an MLLM. The process begins when a user speaks to invoke the digital assistant, which implements the visual reasoning system, in some instances, using a wake word or phrase like "Hey AI". Although, in other instances, other techniques may be used to invoke the assistant. Upon detecting user speech via the microphone, the AR device initiates a multi-frame capture sequence, beginning to capture images at a first fixed frame capture rate. This first fixed frame capture rate is strategically set to balance comprehensive data capture with processing and power constraints. For example, with some embodiments, the initial frame capture rate may be less than one image per second, one image per second, two images per second, or three images per second. Importantly, the initial fixed frame capture rate is typically set so that the processing of images does not but an undue burden on the system.

Each captured image is processed to detect the presence of a human hand using a simple algorithm, rather than using multiple complex gesture detection or recognition algorithms. When a hand is detected in a captured image, the frame capture rate increases from the first fixed frame capture rate to a second, higher fixed frame capture rate. This increase ensures that any hand gestures made by the user are captured in subsequent images, providing more detailed information during potentially crucial moments of user interaction.

Upon completion of the user query, the recorded audio, representing the user query, is processed and converted to text using an audio-to-text translator. Then, a prompt processor constructs a first prompt for use as input with the MLLM. The prompt typically will include an instruction, a series of timestamped messages (each containing a captured frame and its corresponding timestamp), and the text representing the user query. This prompt is transmitted over a network to an MLLM for processing, with the instruction directing the MLLM to analyze the sequence of messages and provide details for understanding the intent of the user query. The MLLM may be constrained to output a predetermined maximum number of tokens (e.g., typically in the range of 25-40), which reduces processing time and focuses the MLLM's response on the most relevant details extracted from the frames in the sequence of messages.

The output from the MLLM is then received back at the AR device and used to construct a second prompt for an LLM This prompt includes an instruction, at least a portion of the MLLM output, and the user query. The LLM prompt is communicated over a network to the LLM for processing, and the LLM generates a final response to the user query.

For example, if a user asks "Hey AI, can I eat this object right here?" while pointing at a banana, the system would capture multiple frames using two different frame capture rates. Initially, the system captures frames at a first fixed frame capture rate, which is strategically set to balance comprehensive data capture with processing and power constraints. When the hand recognition component detects the user's hand pointing at the banana, the system increases to a second, higher fixed frame capture rate. This adaptive approach ensures more detailed information is captured during the crucial moment of the hand gesture, while conserving power when no hand is present. The MLLM would then analyze these frames along with the user query text, potentially outputting: "The user is pointing at a banana and asking if it can be eaten." This output, combined with the original query, would be used to construct a prompt for the LLM, which would generate an appropriate response about the edibility of bananas.

The innovative multi-frame capture technique set forth herein offers several key advantages over conventional visual reasoning approaches, each stemming from specific aspects of its implementation. The proposed solution not only addresses the limitations of traditional methods but also provides a more natural and efficient user experience in AR environments.

The multi-frame capture approach significantly improves accuracy and context awareness in interpreting user queries. By capturing and analyzing multiple frames over time, the system can better correlate speech with visual cues, leading to more accurate interpretation of user queries in AR environments. This temporal context allows the system to make inferences about the user's intent based on the correlation between their speech and visual cues across the entire interaction, addressing the limitations of single-frame methods that often miss crucial contextual information.

The adaptive frame capture rate employed by this technique offers substantial benefits in terms of power efficiency, which is particularly crucial for battery-powered AR devices. Initially capturing frames at a lower rate conserves power, while increasing the capture rate only when a hand is detected ensures detailed information is captured during crucial moments of user interaction. For example, the system might start with a capture rate of one frame every three to five seconds, then increase to two or more frames per second when a hand is detected. This adaptive approach optimizes power usage without compromising on capturing essential visual information, striking a balance between comprehensive data capture and device constraints.

The simplified hand recognition approach used in this technique reduces computational complexity and hardware requirements, making it more suitable for implementation in AR headsets with limited processing capabilities. By using a simple hand detection algorithm rather than multiple complex gesture recognition models, the system accommodates various gestures and interaction styles without requiring specific, rigid gestures. This flexibility supports more natural user behavior and reduces the processing load on the device, contributing to improved battery life and thermal management.

Privacy awareness is enhanced through the system's approach to initiating capture only upon detecting user speech. This method limits continuous visual data collection, addressing potential privacy concerns associated with always-on visual capture in AR devices. By balancing the need for comprehensive data capture with user privacy, the system provides a more trustworthy and user-friendly experience.

Finally, the two-stage processing approach, utilizing both an MLLM and an LLM, allows for efficient and focused processing of multimodal input. The MLLM first extracts relevant details from the image sequence and user query, with its output constrained to a low token count (e.g., around 30 tokens) to reduce processing time. This extracted information is then used to construct a prompt for the LLM, which generates the final response. This approach optimizes the use of computational resources, potentially reducing response times and improving the overall user experience.

Accordingly, the multi-frame capture technique, with its adaptive frame rate, simplified hand detection, and efficient two-stage processing, offers a comprehensive solution to the challenges of visual reasoning in AR environments. By addressing issues of accuracy, power efficiency, computational complexity, privacy, and processing speed, this approach paves the way for more natural, efficient, and context-aware interactions in AR applications. Other aspects and advantages of the several embodiments of the present invention will be readily apparent from the description of the several figures that follow.

Figure 3:
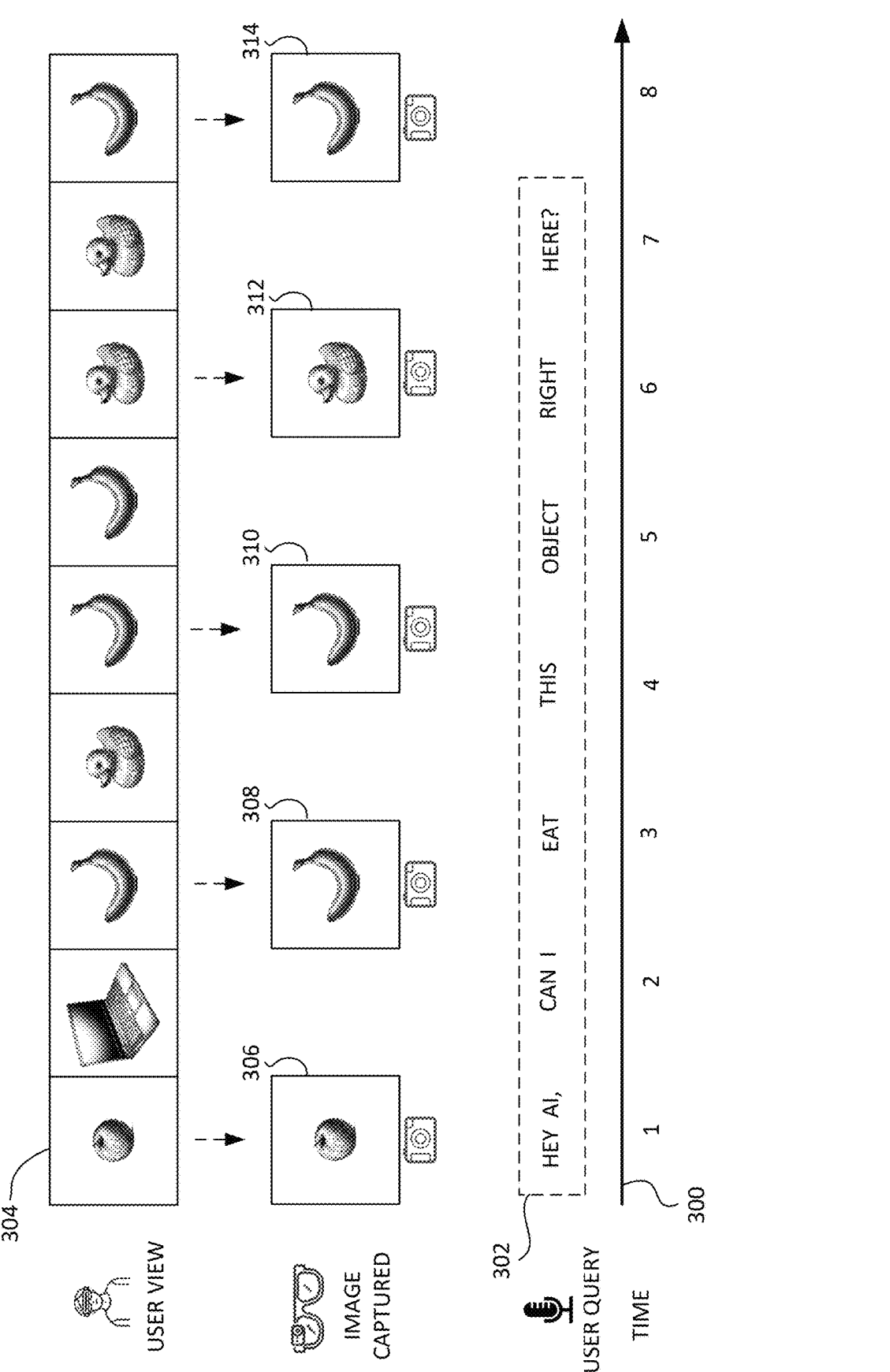
FIG. 3 is a diagram showing a multi-frame capture sequence aligned with a user's query over time, according to some embodiments.

FIG. 3 illustrates a timeline 300 that conveys the passing of time as a user wearing an AR device observes objects in the environment, represented by the user view 304. Similar to the timeline illustrated in FIG. 2, this timeline 300 demonstrates the sequence of events during a user interaction with the visual reasoning system. In this example, image capture commences upon detecting an audible command from the user, for example, around time unit "1", when the user says, "Hey AI . . . ". The system initially employs a fixed frame capture rate, which may be set to capture one image every 1, 2, 3, 4, or 5 seconds, depending on the specific implementation.

As shown in FIG. 3, five images are captured during the user's query 302, represented by frames 306, 308, 310, 312, and 314. In this example, no hand is detected in the captured images, resulting in a consistent capture rate throughout the interaction. When the user query ends (around time, T=7), which may be determined by detecting silence or a pause in the detection of audible words, the system converts the user's recorded speech to text. The captured images and the text-based user query are then used to generate a first prompt for further processing by an MLLM.

Each captured image is timestamped, and these timestamped images are added to an MLLM prompt. In some examples, this first MLLM prompt includes an instruction along with the user's query. The process of constructing and processing an MLLM prompt is discussed in greater detail in the description of FIG. 5.

This approach allows the system to capture a sequence of images that represent the user's visual context throughout their query, providing a more comprehensive input for the visual reasoning system to interpret the user's intent accurately. The timestamp messages included in the MLLM prompt can be used by the MLLM to disambiguate the word "this" by providing temporal context for the user's query and visual input. By analyzing the sequence of timestamped images in relation to the timing of the user's speech, the MLLM can more accurately determine which object the user is referring to when they say "this". In some embodiments, timing data may also be included in the prompt for the user query, allowing the MLLM to correlate the timing of specific words or phrases in the query with the corresponding visual information captured at those moments. This temporal alignment of speech and visual data enables the MLLM to make more precise inferences about the user's intent, particularly when dealing with ambiguous references like "this" or "that".

Figure 4:
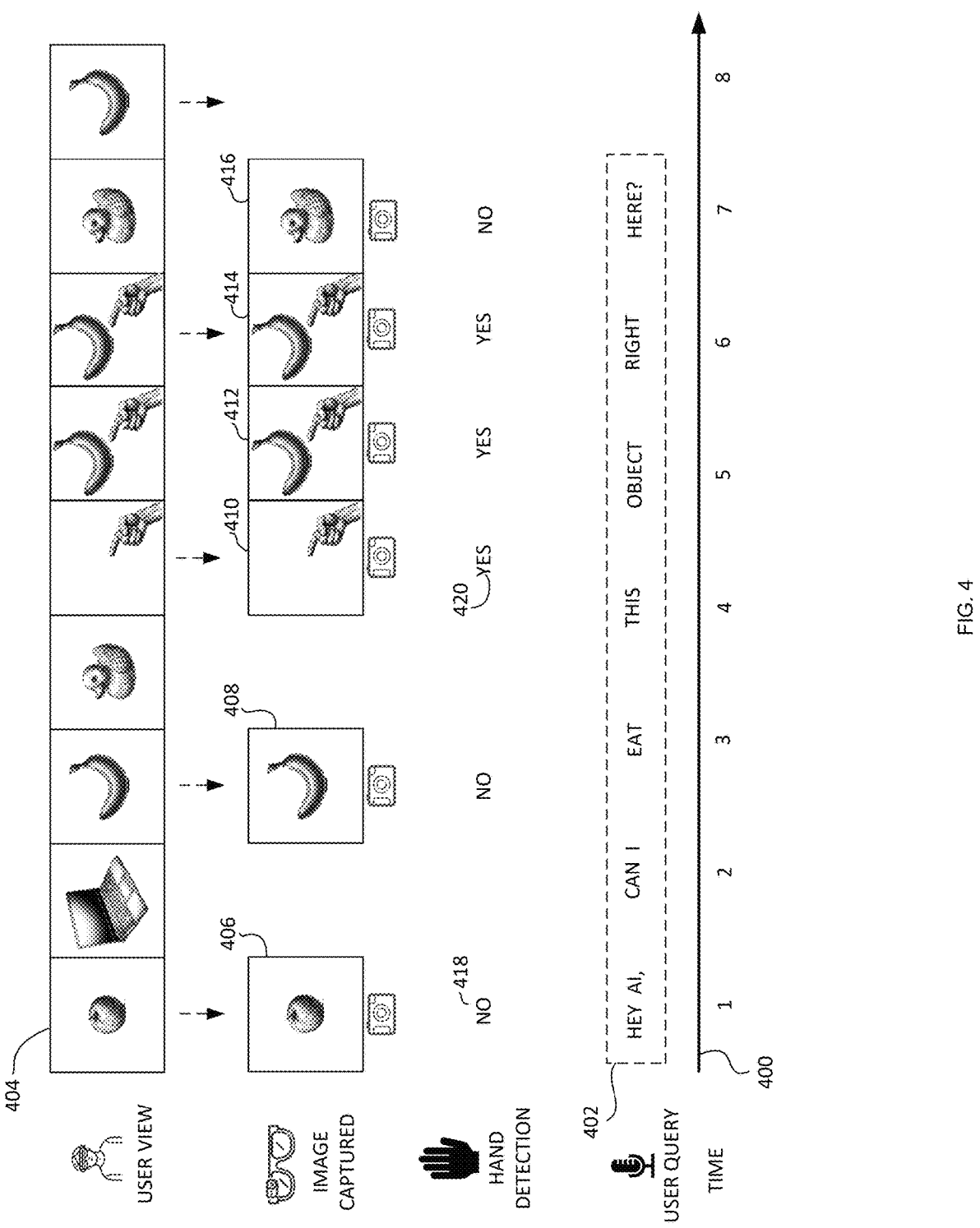
FIG. 4 is a diagram illustrating adaptive frame capture rate based on hand detection, according to some embodiments.

FIG. 4 illustrates a timeline 400 that demonstrates the adaptive frame capture rate system in action, along with the hand detection analysis that occurs for each captured image, consistent with some examples. Similar to previous figures, the timeline 400 shows the user's view 404 as they observe and interact with objects on a desk while issuing a query 402. The system begins capturing images at a first fixed frame capture rate upon detecting the user's speech, represented by the initial captured images 406 and 408. At this stage, no hand is detected in these frames, as indicated by the "NO" labels 418 under the hand detection row.

Consistent with some examples, the initial fixed frame capture rate is strategically set to optimize performance while balancing power constraints of the AR device. This initial frame capture rate is carefully chosen to ensure comprehensive data capture without placing undue burden on the system's processing capabilities or power resources. While specific examples of frame capture rates are provided, such as one image every 1, 2, 3, 4, or 5 seconds, these are intended to be illustrative rather than limiting. The optimal frame capture rate may vary depending on the specific implementation, hardware capabilities, and use case scenarios. Therefore, the innovation is not constrained to any particular frame capture rate(s), but rather encompasses the adaptive approach of adjusting the capture rate based on detected user interactions, such as when a hand is detected in a captured frame. This flexibility allows the system to efficiently capture relevant visual information while conserving power when less detailed capture is sufficient, making it suitable for a wide range of AR devices with varying processing and power capabilities.

Upon capturing the image with reference 410, a hand is detected as indicated by the "YES" label 420. At this point, the frame capture rate is increased from the first fixed frame capture rate to a second, higher fixed frame capture rate. This adaptive approach ensures that a sufficient number of images are captured that depict possible hand gestures, providing more detailed information during potentially crucial moments of user interaction.

The increased frame capture rate results in additional images being captured in quick succession, as shown by frames 412 and 414. These frames continue to show hand presence, indicated by the "YES" labels under hand detection. This higher capture rate allows the system to gather more detailed visual context data throughout the user's query, providing the necessary information for the MLLM to accurately interpret the user's intent.

At around time T=7, an image of a rubber duck (416) is captured, and no hand is present. As a result, the frame capture rate is reduced to the original fixed rate, as indicated by the "NO" label under hand detection for this frame. This demonstrates the system's ability to dynamically adjust the capture rate based on the presence or absence of hand gestures, optimizing power usage and processing resources.

The adaptive frame capture system works by continuously analyzing each captured image for the presence of a hand using a simple algorithm. When a hand is detected, it triggers an increase in the capture rate, allowing for more detailed tracking of potential gestures. This approach is advantageous as it requires only a relatively simple algorithm to identify the depiction of a hand in an image, rather than complex gesture recognition algorithms, thus reducing computational complexity and hardware requirements.

By only increasing the capture rate when necessary, the system balances the need for detailed gesture information with power and processing constraints. This method minimizes unnecessary data collection and processing while still ensuring that potentially important gestural information is captured. The approach is particularly beneficial for battery-powered AR devices, as it optimizes power usage without compromising on capturing essential visual information.

Accordingly, FIG. 4 effectively illustrates how the adaptive frame capture system dynamically adjusts its capture rate based on detected hand presence, providing a rich set of visual context data throughout the user's query. This method enables the system to gather comprehensive information for accurate intent interpretation by the MLLM, without relying on complex and resource-intensive gesture recognition algorithms.

Figure 5:
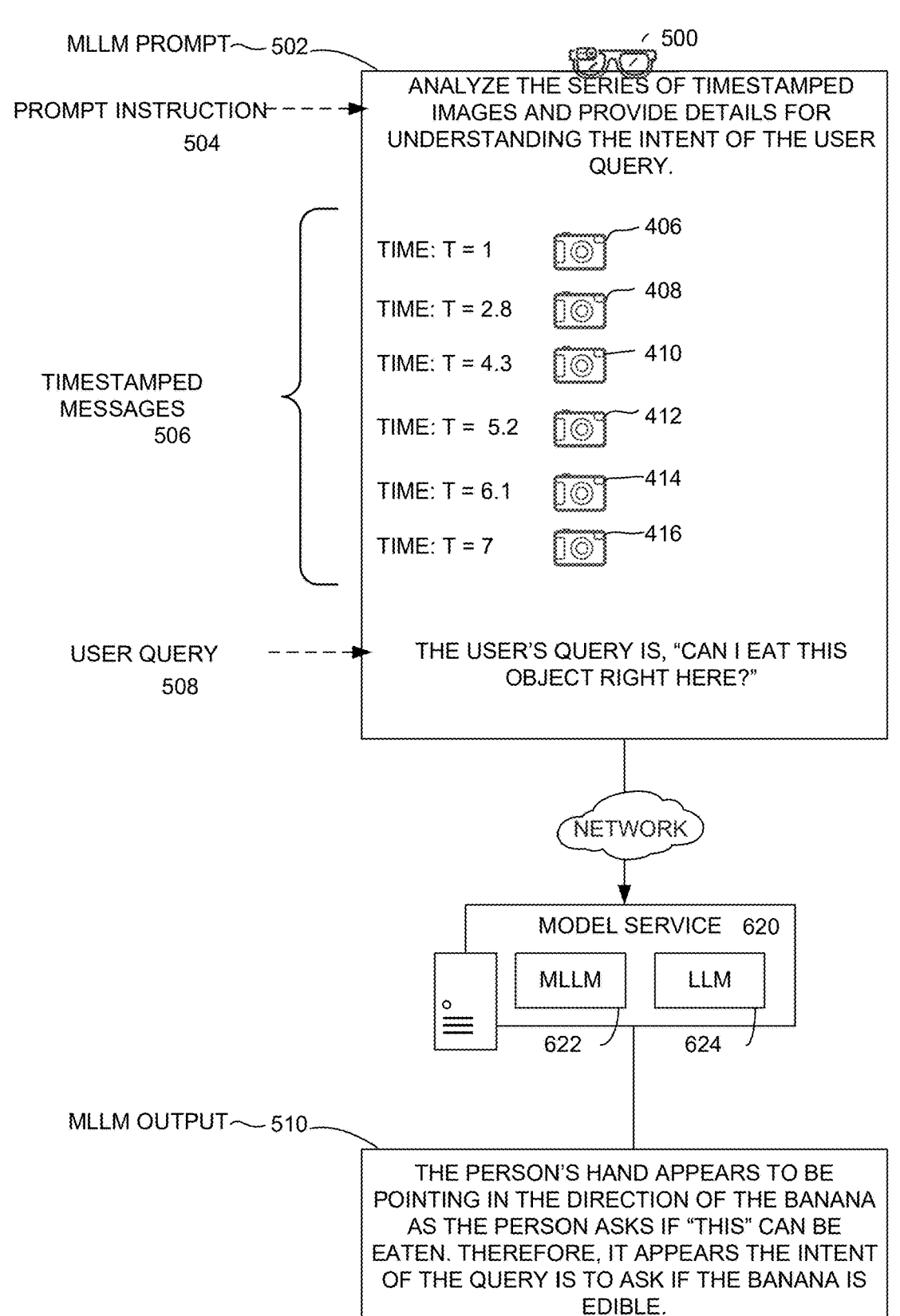
FIG. 5 is a block diagram showing the structure of a multimodal large language model (MLLM) prompt and its processing, according to some embodiments.

FIG. 5 illustrates the process of constructing an MLLM prompt by an AR device 500, and then transmitting the prompt over a network for processing by the MLLM 622, consistent with some examples. FIG. 5 shows the components of the MLLM prompt 502 as constructed by the AR device 500. The MLLM prompt 502 consists of three main components. First is the prompt instruction 504, which, in this example, directs the MLLM to "analyze the series of timestamped messages and provide details for understanding the intent of the user query." This instruction is used to direct or guide the MLLM's analysis of the visual and textual data.

Second, the timestamped messages 506 contain a series of captured frames (406, 408, 410, 412, 414, 416) along with their corresponding timestamps. Each timestamp indicates the precise time at which the frame was capture. Each frame is paired with a timestamp (T=1, T=2.8, T=4.3, T=5.2, T=6.1, T=7) to create a chronological sequence of visual information. This sequence corresponds to the frames captured during the user interaction, as illustrated in FIG. 4, and includes frames captured at both the first fixed frame capture rate and the increased frame capture rate when the hand gestures were detected.

Third, the user query 508 includes the text-based version of the user's spoken query, which in this case is "can I eat this object right here?" This text is obtained through the audio-to-text translation process performed by the AR device 500 after the user completes their query.

The AR device 500 constructs this prompt 502 by combining the data obtained during the user interaction. The captured frames, which have been analyzed for hand presence and captured at varying rates as shown in FIG. 4, are included as timestamped messages. The transcribed user query is added as the final component. This construction process allows the system to maintain the temporal relationship between the visual input and the user's speech, which allows for accurate interpretation of the user's intent.

After constructing the prompt, the AR device communicates it over a network to the remote model service 620. At the model service 620, the prompt 504 is processed by an MLLM 622. The MLLM 622 analyzes the sequence of timestamped images in conjunction with the user query to extract relevant details and understand the user's intent.

The output of the MLLM 510 is then communicated back over the network to the AR device 500. In this example, the MLLM output states: "The person's hand appears to be pointing in the direction of the banana as the person asks if 'this' can be eaten. Therefore, it appears the intent of the query is to ask if the banana is edible." This output demonstrates how the MLLM uses the temporal information from the timestamped images to correlate the hand gesture with the spoken query, resolving the ambiguity of the word "this" in the user's question.

This process allows the system to leverage the power of off-device processing while maintaining context through the use of multiple timestamped frames. It enables more accurate interpretation of user queries in AR environments by considering both visual and auditory inputs over time, addressing the limitations of traditional single-frame capture methods and providing a more comprehensive understanding of the user's intent.

The MLLM may be constrained to output some predetermined maximum number of tokens, which significantly reduces processing time and focuses the MLLM's response on the most relevant details extracted from the frames in the sequence of messages. This constraint helps optimize the system's performance, especially important for maintaining responsiveness in AR applications.

Figure 6:
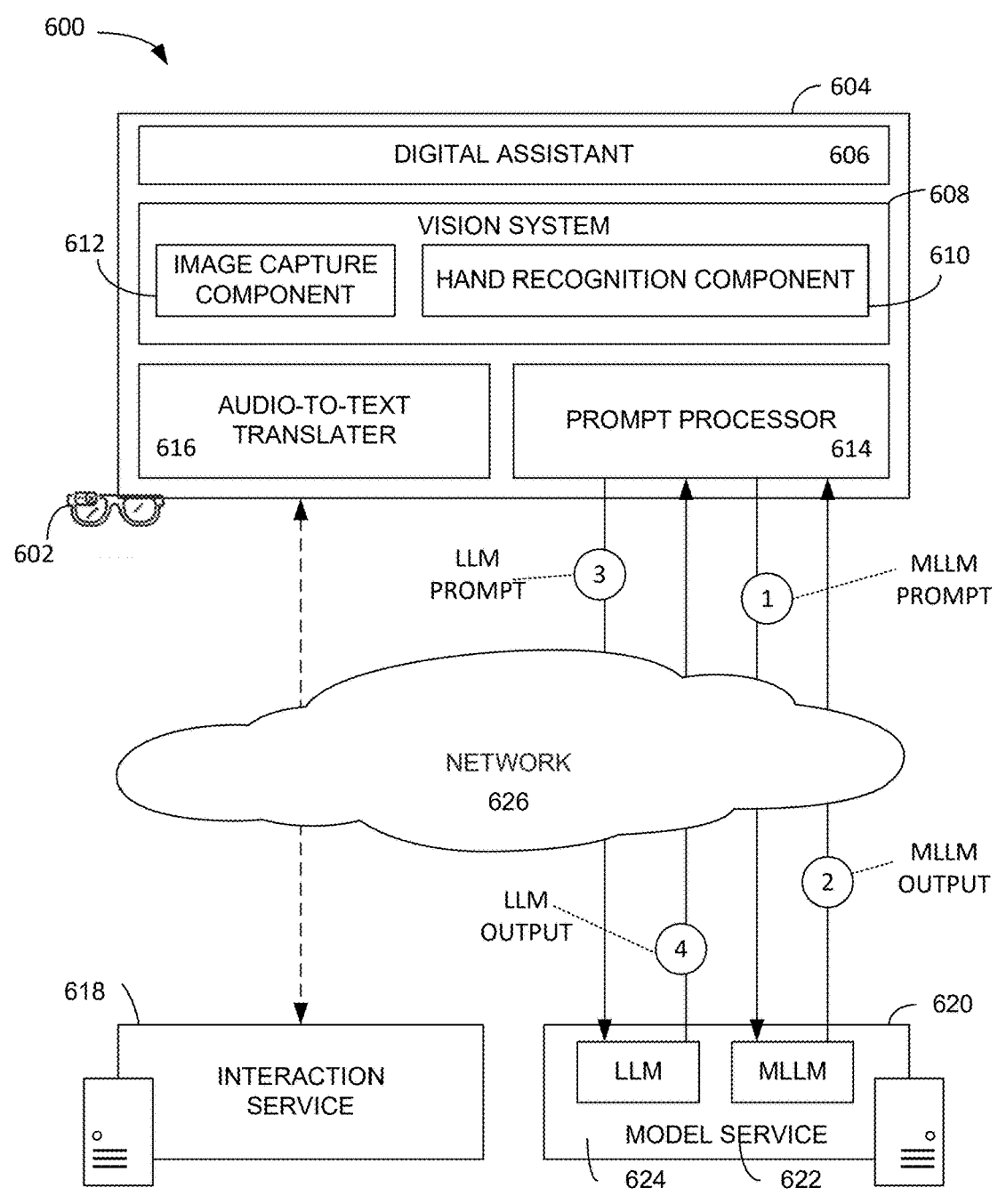
FIG. 6 is a system architecture diagram of a digital assistant implementing the multi-frame capture and processing system, according to some embodiments.

FIG. 6 illustrates a system architecture 600 for implementing the multi-frame capture and processing technique in an AR device. The overall system 600 comprises several components that work together to enable accurate visual reasoning and natural user interactions. In this particular implementation, the visual reasoning component is represented by the vision system 608, which is a subcomponent or service provided by the AR device. The digital assistant 606, which in this case is an application that executes on the AR device, can leverage the functionality of the vision system 608.

As illustrated in FIG. 6, the vision system 608 includes two elements: the image capture component 612 and the hand recognition component 610. The image capture component is responsible for capturing frames at varying rates as described in FIG. 4, while the hand recognition component analyzes these frames to detect the presence of hands, triggering the adaptive frame capture rate.

It is important to note that in other implementations, the arrangement may differ. The visual reasoning system may be part of an application rather than a service provided by the operating system of the AR device. This flexibility allows for different architectural approaches depending on the specific requirements and constraints of the AR system being developed.

The audio-to-text translator 616 converts the user's spoken query into text, which is essential for constructing the prompts for both the MLLM and LLM. The prompt processor 614 provides the logic for constructing these prompts, combining the captured images, timestamps, and transcribed user query.

The system leverages external services through a network 626. The model service 620 hosts both the MLLM 622 and LLM 624, which process the constructed prompts and generate outputs. As represented in FIG. 6, the prompt processor 614 constructs and transmits the MLLM prompt (indicated by the number 1 enclosed in a circle) to the model service 620 via the network 626. The MLLM 622 processes this prompt and generates the MLLM output, which is then transmitted back to the prompt processor (represented by the number 2 enclosed in a circle).

Similarly, the prompt processor 614 constructs the LLM prompt using the MLLM output and the original user query. This LLM prompt is then transmitted to the model service 620 (indicated by the number 3 enclosed in a circle). The LLM 624 processes this prompt and generates the LLM output, which is sent back to the interaction service 618

(represented by the number 4 enclosed in a circle). This two-stage processing approach allows for efficient handling of multimodal inputs and generation of contextually appropriate responses.

The interaction service 618 plays a multifaceted role in the AR device ecosystem, providing services that extend beyond the core visual reasoning functionality. While tangential to the primary scope of the invention, these services enhance the overall user experience and device functionality.

One function of the interaction service 618 is to facilitate software management on the AR device. This includes enabling users to download and update applications, ensuring the device remains current with the latest features and security patches. This capability is crucial for maintaining the device's performance and expanding its functionality over time.

In some implementations, the interaction service 618 may incorporate social networking features. This allows users of the AR device to engage with a broader digital ecosystem, interacting with users on various platforms including conventional mobile devices, other computing devices, and other AR devices. This social connectivity can significantly enhance the utility and appeal of the AR device by integrating it into users' existing digital social networks.

Furthermore, the interaction service 618 may support the execution of additional applications on the AR device. These could include content feed applications where users can generate and share various types of content, as well as messaging systems for communication. Such applications leverage the unique capabilities of the AR device while providing familiar and useful functionalities to users.

By offering these additional services, the interaction service 618 transforms the AR device from a specialized visual reasoning tool into a more comprehensive and versatile computing platform, enhancing its value and utility for users in various contexts.

FIG. 7 illustrates a method 700 implemented by the system in FIG. 6. The process begins when the system detects user speech (step 702), which triggers the multi-frame capture sequence (step 704). This corresponds to the image capture component 612 in FIG. 6 initiating its operation.

As frames are captured, they are continuously monitored for hand gestures (step 706), a task performed by the hand recognition component 610. When a hand is detected, the frame capture rate increases (step 708), demonstrating the adaptive nature of the system.

The capture sequence ends when the user's speech concludes (step 710). The audio-to-text translator 616 then converts the captured audio to text (step 712). The prompt processor 614 constructs the MLLM prompt (step 714) by combining the timestamped captured images, transcribed user query, and a custom MLLM instruction.

This MLLM prompt is transmitted to the MLLM 622 for processing (step 716). Upon receiving the MLLM output, the prompt processor 614 constructs the LLM prompt (step 718), which is then sent to the LLM 624 (step 720).

Finally, the system generates a response based on the LLM output (step 722.) Consistent with some example, the final response generation process by the AR device involves a series of steps designed to ensure the output is accurate, contextually appropriate, and presented in the most suitable format for the user. Upon receiving the output or response from the LLM, the AR device may first process this response to extract specific information relevant to the user's query. For instance, if the user inquired about the edibility of an object, the system would parse the LLM's text response to identify key phrases indicating whether the object is safe to consume or not.

In some implementations, the system may evaluate the LLM's response to trigger additional processing operations before presenting the final output to the user. An application running on the AR device might analyze the LLM's response to determine the next appropriate action. For example, if a user asks for directions, the text-based route information provided by the LLM could be interpreted by the AR device to generate a visual overlay within the AR display, guiding the user in the correct direction to travel.

In some examples, the system is capable of presenting the final response in various formats to enhance user experience and comprehension. The text of the response may be displayed as visual information on the AR device's display, which could include overlaying text on the user's field of view or presenting it in a dedicated interface area. Alternatively, the text response from the LLM can be converted into an audible file using text-to-speech technology, which is then played back through the AR device's speaker, allowing the user to hear the response.

For certain queries, the system might generate graphical elements or virtual components within the AR display. This could include arrows for navigation, highlighting objects in the user's view, or displaying additional information about recognized items. In some implementations, the system could provide haptic feedback to convey information or alerts to the user, such as vibrations to indicate direction or confirmation of an action.

In some examples, the AR device and overall system may employ context-aware output selection, choosing the most appropriate output method based on the specific application and user context. For instance, in a noisy environment, visual or haptic feedback might be prioritized over audio output. The final response may also trigger interactions with other services or applications on the AR device. As an example, if the user's query results in the need to schedule an appointment, the system could interface with a calendar application to suggest available time slots.

To continually improve its performance, the AR device may log user interactions and responses. This data can be used to refine the prompt engineering process or adjust the output generation based on user preferences and feedback. By employing this multi-faceted approach to response generation and presentation, the AR device provides a rich, context-aware, and user-friendly experience that leverages the full capabilities of the AR device while addressing the specific needs and preferences of the user.

This integrated system and method enable a sophisticated approach to visual reasoning in AR environments. By combining adaptive multi-frame capture, efficient hand detection, and a two-stage processing approach using both MLLM and LLM, the system can accurately interpret user queries while considering both visual and auditory inputs over time. This addresses the limitations of traditional single-frame capture methods and provides a more comprehensive understanding of the user's intent in AR interactions.

System with Head-Wearable Apparatus

Figure 8:
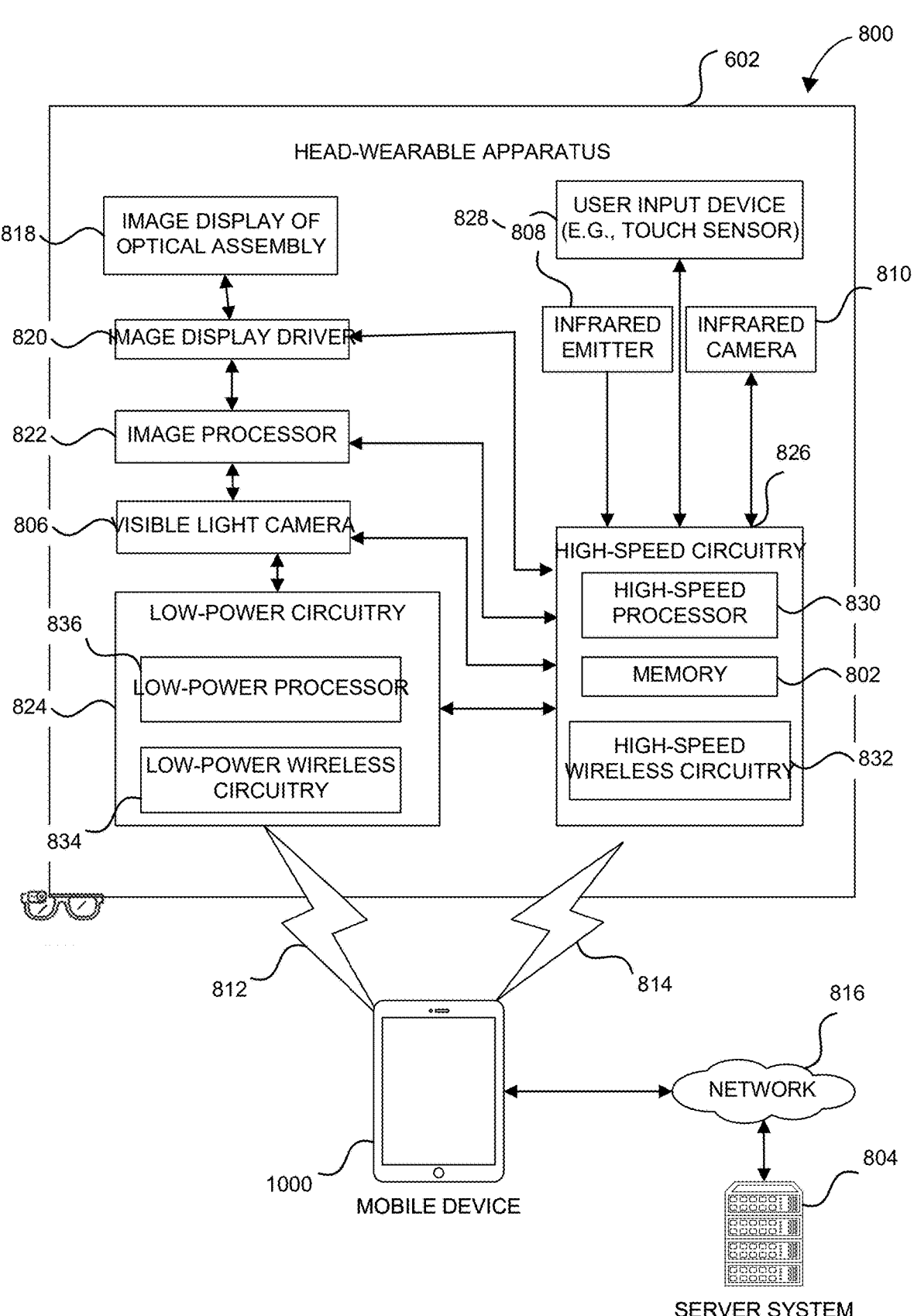
FIG. 8 is a block diagram of a head-wearable apparatus implementing the multi-frame capture system, according to some embodiments.

FIG. 8 illustrates a system 800 including a head-wearable apparatus 116 with a selector input device, according to some examples. FIG. 8 is a high-level functional block diagram of an example head-wearable apparatus 116 communicatively coupled to a mobile device 114 and various server systems 804 (e.g., the server system 110) via various networks 108.

The head-wearable apparatus 116 includes one or more cameras, each of which may be, for example, a visible light camera 806, an infrared emitter 808, and an infrared camera 810.

The mobile device 114 connects with head-wearable apparatus 116 using both a low-power wireless connection 812 and a high-speed wireless connection 814. The mobile device 114 is also connected to the server system 804 and the network 816.

The head-wearable apparatus 116 further includes two image displays of the image display of optical assembly 818. The two image displays of optical assembly 818 include one associated with the left lateral side and one associated with the right lateral side of the head-wearable apparatus 116. The head-wearable apparatus 116 also includes an image display driver 820, an image processor 822, low-power circuitry 824, and high-speed circuitry 826. The image display of optical assembly 818 is for presenting images and videos, including an image that can include a graphical user interface to a user of the head-wearable apparatus 116.

The image display driver 820 commands and controls the image display of optical assembly 818. The image display driver 820 may deliver image data directly to the image display of optical assembly 818 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 828 (e.g., touch sensor or push button), including an input surface on the head-wearable apparatus 116. The user input device 828 (e.g., touch sensor or push button) is to receive from the user an input selection to manipulate the graphical user interface of the presented image.

The components shown in FIG. 8 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 806 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 802, which stores instructions to perform a subset, or all the functions described herein. The memory 802 can also include storage device.

As shown in FIG. 8, the high-speed circuitry 826 includes a high-speed processor 830, a memory 802, and high-speed wireless circuitry 832. In some examples, the image display driver 820 is coupled to the high-speed circuitry 826 and operated by the high-speed processor 830 to drive the left and right image displays of the image display of optical assembly 818. The high-speed processor 830 may be any processor capable of managing high-speed communications and operation of any general computing system needed for the head-wearable apparatus 116. The high-speed processor 830 includes processing resources needed for managing high-speed data transfers on a high-speed wireless connection 814 to a wireless local area network (WLAN) using the high-speed wireless circuitry 832. In certain examples, the high-speed processor 830 executes an operating system such as a LINUX operating system or other such operating system of the head-wearable apparatus 116, and the operating system is stored in the memory 802 for execution. In addition to any other responsibilities, the high-speed processor 830 executing a software architecture for the head-wearable apparatus 116 is used to manage data transfers with high-speed wireless circuitry 832. In certain examples, the high-speed wireless circuitry 832 is configured to implement Institute of Electrical and Electronic Engineers (IEEE) 802.11 communication standards, also referred to herein as WI-FI®. In some examples, other high-speed communications standards may be implemented by the high-speed wireless circuitry 832.

The low-power wireless circuitry 834 and the high-speed wireless circuitry 832 of the head-wearable apparatus 116 can include short-range transceivers (e.g., Bluetooth™, Bluetooth LE, Zigbee, ANT+) and wireless wide, local, or wide area network transceivers (e.g., cellular or WI-FIR). Mobile device 114, including the transceivers communicating via the low-power wireless connection 812 and the high-speed wireless connection 814, may be implemented using details of the architecture of the head-wearable apparatus 116, as can other elements of the network 816.

The memory 802 includes any storage device capable of storing various data and applications, including, among other things, camera data generated by the left and right visible light cameras 806, the infrared camera 810, and the image processor 822, as well as images generated for display by the image display driver 820 on the image displays of the image display of optical assembly 818. While the memory 802 is shown as integrated with high-speed circuitry 826, in some examples, the memory 802 may be an independent standalone element of the head-wearable apparatus 116. In certain such examples, electrical routing lines may provide a connection through a chip that includes the high-speed processor 830 from the image processor 822 or the low-power processor 836 to the memory 802. In some examples, the high-speed processor 830 may manage addressing of the memory 802 such that the low-power processor 836 will boot the high-speed processor 830 any time that a read or write operation involving memory 802 is needed.

As shown in FIG. 8, the low-power processor 836 or high-speed processor 830 of the head-wearable apparatus 116 can be coupled to the camera (visible light camera 806, infrared emitter 808, or infrared camera 810), the image display driver 820, the user input device 828 (e.g., touch sensor or push button), and the memory 802.

The head-wearable apparatus 116 is connected to a host computer. For example, the head-wearable apparatus 116 is paired with the mobile device 114 via the high-speed wireless connection 814 or connected to the server system 804 via the network 816. The server system 804 may be one or more computing devices as part of a service or network computing system, for example, that includes a processor, a memory, and network communication interface to communicate over the network 816 with the mobile device 114 and the head-wearable apparatus 116.

The mobile device 114 includes a processor and a network communication interface coupled to the processor. The network communication interface allows for communication over the network 816, low-power wireless connection 812, or high-speed wireless connection 814. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 820. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 804, such as the user input device 828, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 812 and high-speed wireless connection 814 from the mobile device 114 via the low-power wireless circuitry 834 or high-speed wireless circuitry 832.

Machine Architecture

Figure 9:
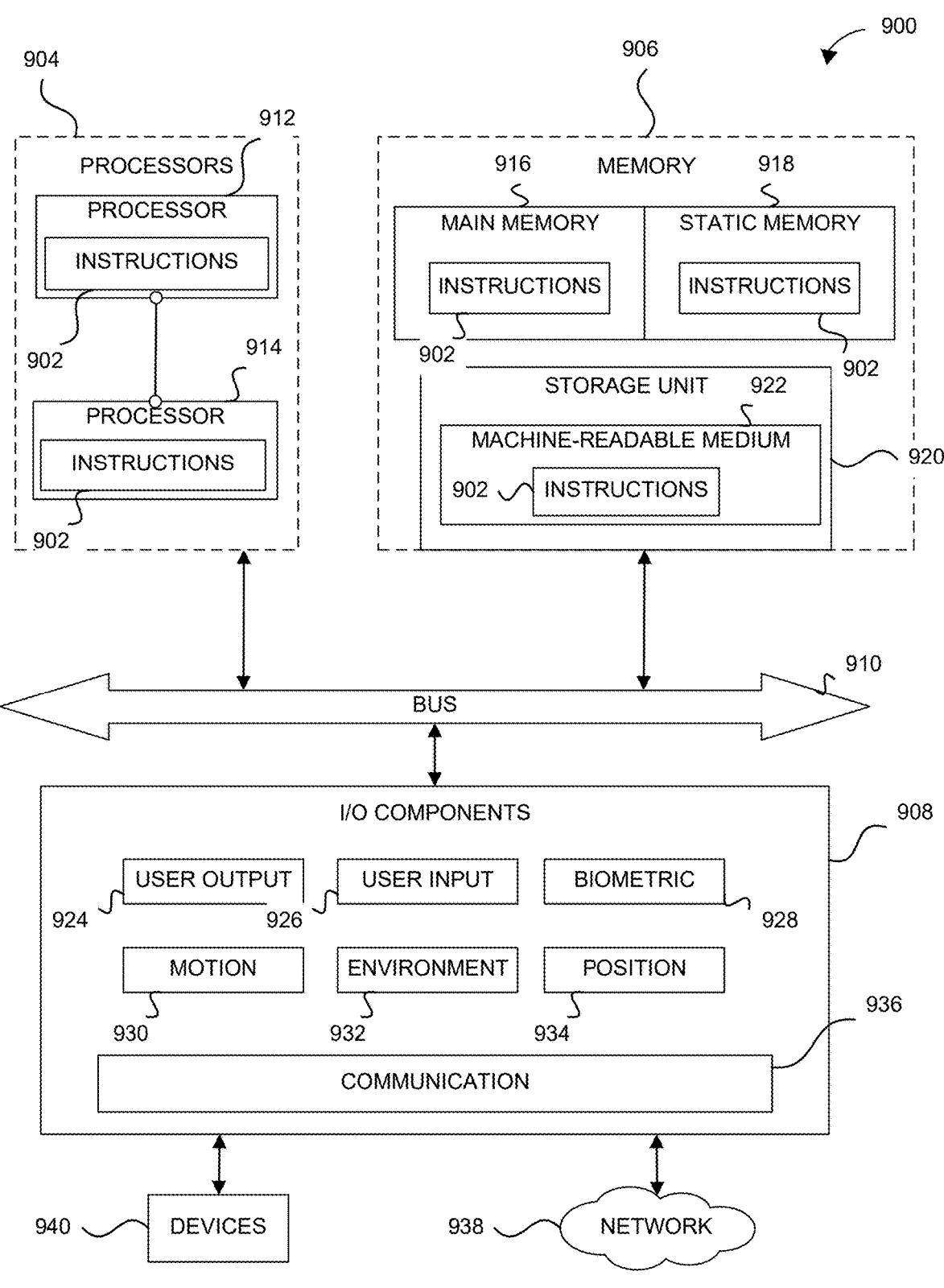
FIG. 9 is a block diagram illustrating the components of a machine capable of executing the multi-frame capture and processing method, according to some embodiments.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the server system 110. In some examples, the machine 900 may also comprise both client and server systems, with certain operations of a particular method or algorithm being performed on the server-side and with certain operations of the method or algorithm being performed on the client-side.

The machine 900 may include processors 904, memory 906, and input/output I/O components 908, which may be configured to communicate with each other via a bus 910.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
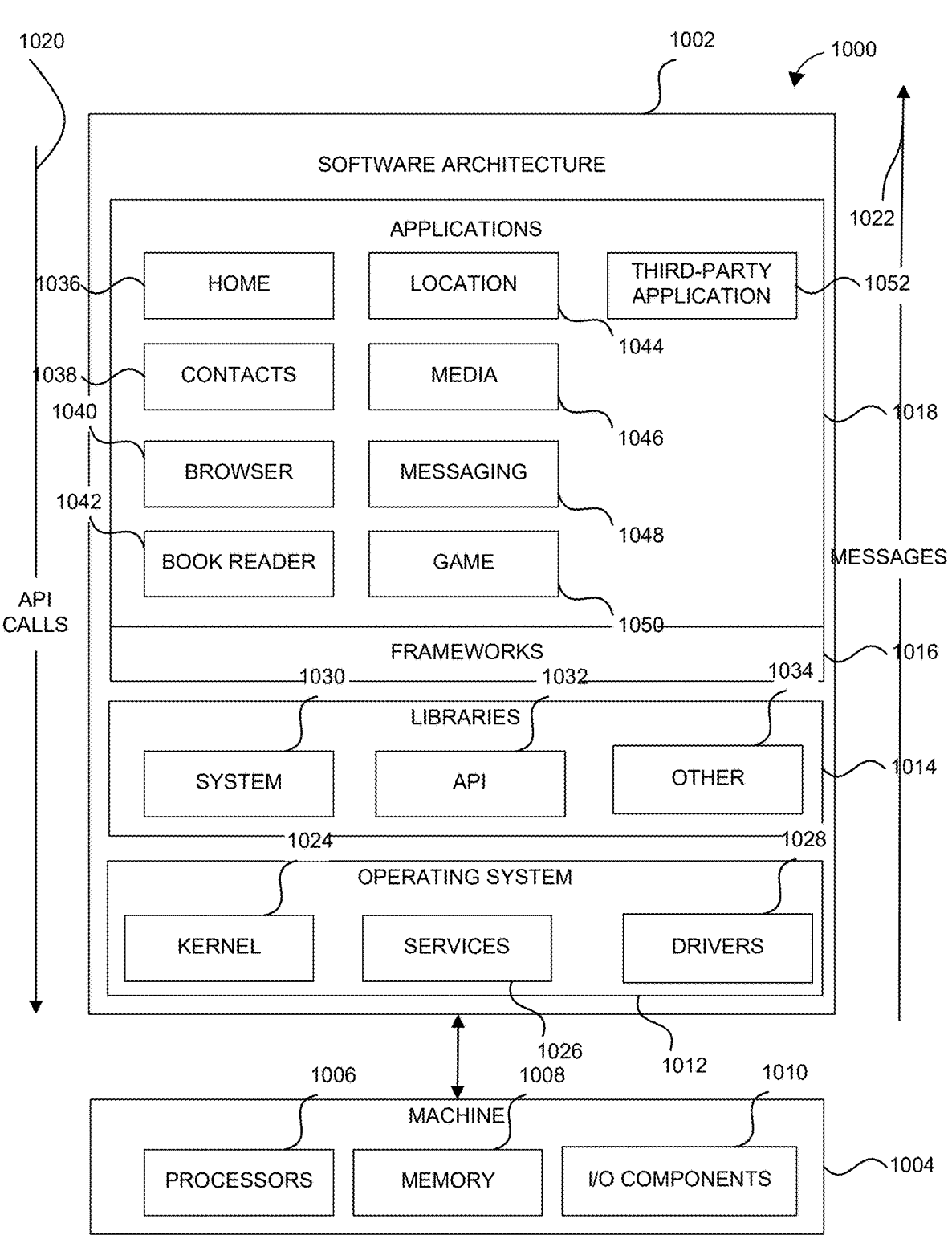
FIG. 10 is a block diagram showing a software architecture for implementing the multi-frame capture and processing system, according to some embodiments.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematical functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Examples

Example 1 is a device comprising: at least one processor; at least one camera; a display component; a microphone; a network interface; and memory storing instructions that, when executed by the at least one processor, cause the device to perform operations comprising: upon detecting user speech obtained via the microphone, initiating a multi-frame capture sequence, by: capturing, via the at least one camera, a series of frames at a first frame capture rate; upon detecting a human hand within a frame of the series of frames, increasing a frame capture rate from the first frame capture rate to a second frame capture rate; and terminating the multi-frame capture sequence upon detecting an end of user speech; transcribing the user speech to text; constructing a first prompt for use as input with an MLLM, the first prompt comprising an instruction, a sequence of messages with each message containing a captured frame and a corresponding timestamp, and a user query represented by the text derived from transcribing the user speech; transmitting, via the network interface, the first prompt to the MLLM for processing by the MLLM and receiving back a first output; constructing a second prompt for use as input with an LLM, the second prompt comprising an instruction, at least a portion of the first output from the MLLM, and a user query represented by the text derived from transcribing the user speech; transmitting, via the network interface, the second prompt to the LLM for processing by the the LLM and receiving back a response; and outputting the response.

In Example 2, the subject matter of Example 1 includes, wherein the operations further comprise: subjecting each frame captured at the first frame capture rate to a computer vision model trained to detect the presence of a human hand.

In Example 3, the subject matter of Examples 1-2 includes, wherein the first frame capture rate is one frame every three, four, or five seconds, and wherein the second frame capture rate is at least twice the first frame capture rate.

In Example 4, the subject matter of Examples 1-3 includes, wherein the instruction included in the first prompt directs the MLLM to analyze the sequence of messages and a user query represented by the text derived from transcribing the user speech, and to provide details for understanding the intent of the user query.

In Example 5, the subject matter of Examples 1-4 includes, wherein the instruction included in the second prompt for use as input with the LLM directs the LLM to generate the response to the user query based on the first output from the MLLM while focusing on extracted details relevant to the user query about objects or actions depicted in the captured frames, and to format the response for appropriate presentation via an output capability of the device.

In Example 6, the subject matter of Examples 1-5 includes, wherein outputting the generated response comprises at least one of: presenting the response visually on the display component; outputting the response as audio via a speaker of the device; or presenting the response as a combination of visual output on the display component and audio output via the speaker.

In Example 7, the subject matter of Examples 1-6 includes, wherein the operations further comprise: cropping each captured frame to a field of view corresponding to a view of the user, before including the frame as a message in the first prompt.

In Example 8, the subject matter of Examples 1-7 includes, wherein constructing the first prompt further comprises: arranging the sequence of messages containing captured frames and corresponding timestamps in chronological order to represent an entire interaction over time.

In Example 9, the subject matter of Examples 1-8 includes, wherein the MLLM is constrained to output a maximum of thirty tokens, thereby reducing processing time and focusing the response generated by the MLLM on the most relevant details extracted from the frames in the sequence of messages.

Example 10 is a method comprising: detecting, via a microphone of a device, user speech; upon detecting the user speech, initiating a multi-frame capture sequence by: capturing, via at least one camera of the device, a series of frames at a first frame capture rate; upon detecting a human hand within a frame of the series of frames, increasing a frame capture rate from the first frame capture rate to a second frame capture rate; and terminating the multi-frame capture sequence upon detecting an end of user speech; transcribing the user speech to text; constructing a first prompt for use as input with an MLLM, the first prompt comprising an instruction, a sequence of messages with each message containing a captured frame and a corresponding timestamp, and a user query represented by the text derived from transcribing the user speech; transmitting, via a network interface of the device, the first prompt to the MLLM for processing by the MLLM and receiving back a first output; constructing a second prompt for use as input with an LLM, the second prompt comprising an instruction, at least a portion of the first output from the MLLM, and a user query represented by the text derived from transcribing the user speech; transmitting, via the network interface, the second prompt to the LLM for processing by the LLM and receiving back a response; and outputting the response.

In Example 11, the subject matter of Example 10 includes, subjecting each frame captured at the first frame capture rate to a computer vision model trained to detect the presence of a human hand.

In Example 12, the subject matter of Examples 10-11 includes, wherein the first frame capture rate is one frame every three, four, or five seconds, and wherein the second frame capture rate is at least twice the first frame capture rate.

In Example 13, the subject matter of Examples 10-12 includes, wherein the instruction included in the first prompt directs the MLLM to analyze the sequence of messages and a user query represented by the text derived from transcribing the user speech, and to provide details for understanding the intent of the user query.

In Example 14, the subject matter of Examples 10-13 includes, wherein the instruction included in the second prompt for use as input with the LLM directs the LLM to generate the response to the user query based on the first output from the MLLM while focusing on extracted details relevant to the user query about objects or actions depicted in the captured frames, and to format the response for appropriate presentation via an output capability of the device.

In Example 15, the subject matter of Examples 10-14 includes, wherein outputting the generated response comprises at least one of: presenting the response visually on a display component of the device; outputting the response as audio via a speaker of the device; or presenting the response as a combination of visual output on the display component and audio output via the speaker.

In Example 16, the subject matter of Examples 10-15 includes, cropping each captured frame to a field of view corresponding to a view of the user, before including the frame as a message in the first prompt.

In Example 17, the subject matter of Examples 10-16 includes, wherein constructing the first prompt further comprises: arranging the sequence of messages containing captured frames and corresponding timestamps in chronological order to represent an entire interaction over time.

In Example 18, the subject matter of Examples 10-17 includes, wherein the MLLM is constrained to output a maximum of thirty tokens, thereby reducing processing time and focusing the response generated by the MLLM on the most relevant details extracted from the frames in the sequence of messages.

Example 19 is a device comprising: means for initiating a multi-frame capture sequence upon detecting user speech obtained via the microphone, by: capturing, via the at least one camera, a series of frames at a first frame capture rate; upon detecting a human hand within a frame of the series of frames, increasing a frame capture rate from the first frame capture rate to a second frame capture rate; and terminating the multi-frame capture sequence upon detecting an end of user speech; transcribing the user speech to text; means for constructing a first prompt for use as input with an MLLM, the first prompt comprising an instruction, a sequence of messages with each message containing a captured frame and a corresponding timestamp, and a user query represented by the text derived from transcribing the user speech; means for transmitting, via the network interface, the first prompt to the MLLM for processing by the MLLM and receiving back a first output; means for constructing a second prompt for use as input with an LLM, the second prompt comprising an instruction, at least a portion of the first output from the MLLM, and a user query represented by the text derived from transcribing the user speech; means for transmitting, via the network interface, the second prompt to the LLM for processing by the the LLM and receiving back a response; and means for outputting the response.

In Example 20, the subject matter of Example 19 includes, means for subjecting each frame captured at the first frame capture rate to a computer vision model trained to detect the presence of a human hand.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Definitions

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, network attached storage (NAS), storage area networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" may include, for example, a device accessed, controlled or owned by a user and with which the user interacts perform an action, engagement or interaction on the user device, including an interaction with other users or computer systems.

"Large Language Model" or (LLM)—An LLM is an advanced artificial intelligence model designed to understand and generate human-like text. It is typically built using a neural network architecture, such as a transformer, and is trained on vast amounts of text data. The training process involves feeding the model large corpora of text, which it uses to learn patterns, context, and relationships between words and phrases. The model's goal during training is to predict the next word in a sequence, allowing it to develop a deep understanding of language. Once trained, an LLM can process input text, understand context, and generate coherent and contextually relevant output. These models are widely used in various natural language processing tasks, including text generation, translation, summarization, and conversational agents.

"Multimodal Large Language Model" or MLLM—An MLLM is an advanced artificial intelligence model capable of processing and generating human-like responses across multiple types of data, including text, images, audio, and video. Built on a neural network architecture, often based on transformers, an MLLM is trained on diverse datasets that combine these different modalities, enabling it to understand and integrate information from various sources simultaneously. During training, the model learns to recognize patterns and relationships not only within each modality but also across them, allowing it to generate outputs that consider the full context of the input data. Once trained, an MLLM can accept and process inputs that include combinations of text, images, and other media, and produce coherent, contextually relevant responses that bridge the different modalities. This versatility makes MLLMs valuable in applications such as advanced content creation, cross-modal search, and complex AI-driven interactions.

"Prompt"—A prompt in the context of this disclosure refers to a carefully crafted input or instruction designed to optimize the performance of both the MLLM and the LLM within a multi-frame capture system. Prompts are essential for guiding the models to accurately interpret user queries and generate appropriate responses. For the MLLM, prompts are constructed to analyze sequences of time-stamped images alongside the user query, enabling the model to extract relevant details and understand the user's intent, especially in cases involving ambiguous references. These prompts may be refined iteratively to improve the MLLM's disambiguation capabilities by leveraging the temporal context provided by multiple frames. For the LLM, prompts are tailored to produce comprehensive and contextually relevant responses based on the MLLM's output and the original user query. Different prompt structures, instructions, and constraints may be tested to achieve an optimal balance between response quality and processing efficiency. The prompts described herein are illustrative and not limiting; they may evolve based on ongoing research and system refinement.

What is claimed is:

1. A device comprising: at least one processor; at least one camera; a display component; a microphone; a network interface; and memory storing instructions that, when executed by the at least one processor, cause the device to perform operations comprising: upon detecting user speech obtained via the microphone, initiating a multi-frame capture sequence, by:
   capturing, via the at least one camera, a series of frames at a first frame capture rate;
   upon detecting a human hand within a frame of the series of frames, increasing a frame capture rate from the first frame capture rate to a second frame capture rate; and
   terminating the multi-frame capture sequence upon detecting an end of user speech;
   transcribing the user speech to text;
   constructing a first prompt for use as input with a multimodal large language model (MLLM), the first prompt comprising an instruction, a sequence of messages with each message containing a captured frame and a corresponding timestamp, and a user query represented by the text derived from transcribing the user speech;
   transmitting, via the network interface, the first prompt to the MLLM for processing by the MLLM and receiving back a first output;

constructing a second prompt for use as input with a large language model (LLM), the second prompt comprising an instruction, at least a portion of the first output from the MLLM, and a user query represented by the text derived from transcribing the user speech;

transmitting, via the network interface, the second prompt to the LLM for processing by the LLM and receiving back a response; and outputting the response.

2. The device of claim 1, wherein the operations further comprise:

subjecting each frame captured at the first frame capture rate to a computer vision model trained to detect the presence of a human hand.

3. The device of claim 1, wherein the first frame capture rate is one frame every three, four, or five seconds, and wherein the second frame capture rate is at least twice the first frame capture rate.

4. The device of claim 1, wherein the instruction included in the first prompt directs the MLLM to analyze the sequence of messages and a user query represented by the text derived from transcribing the user speech, and to provide details for understanding the intent of the user query.

5. The device of claim 1, wherein the instruction included in the second prompt for use as input with the LLM directs the LLM to generate the response to the user query based on the first output from the MLLM while focusing on extracted details relevant to the user query about objects or actions depicted in the captured frames, and to format the response for appropriate presentation via an output capability of the device.

6. The device of claim 1, wherein outputting the generated response comprises at least one of:

presenting the response visually on the display component;

outputting the response as audio via a speaker of the device; or presenting the response as a combination of visual output on the display component and audio output via the speaker.

7. The device of claim 1, wherein the operations further comprise:

cropping each captured frame to a field of view corresponding to a view of the user, before including the frame as a message in the first prompt.

8. The device of claim 1, wherein constructing the first prompt further comprises:

arranging the sequence of messages containing captured frames and corresponding timestamps in chronological order to represent an entire interaction over time.

9. The device of claim 1, wherein the MLLM is constrained to output a maximum of thirty tokens, thereby reducing processing time and focusing the response generated by the MLLM on the most relevant details extracted from the frames in the sequence of messages.

10. A method comprising:

detecting, via a microphone of a device, user speech;

upon detecting the user speech, initiating a multi-frame capture sequence by:

capturing, via at least one camera of the device, a series of frames at a first frame capture rate;

upon detecting a human hand within a frame of the series of frames, increasing a frame capture rate from the first frame capture rate to a second frame capture rate; and terminating the multi-frame capture sequence upon detecting an end of user speech; transcribing the user speech to text;

constructing a first prompt for use as input with a multi-modal large language model (MLLM), the first prompt comprising an instruction, a sequence of messages with each message containing a captured frame and a corresponding timestamp, and a user query represented by the text derived from transcribing the user speech;

transmitting, via a network interface of the device, the first prompt to the MLLM for processing by the MLLM and receiving back a first output;

constructing a second prompt for use as input with a large language model (LLM), the second prompt comprising an instruction, at least a portion of the first output from the MLLM, and a user query represented by the text derived from transcribing the user speech;

transmitting, via the network interface, the second prompt to the LLM for processing by the LLM and receiving back a response; and outputting the response.

11. The method of claim 10, further comprising:

subjecting each frame captured at the first frame capture rate to a computer vision model trained to detect the presence of a human hand.

12. The method of claim 10, wherein the first frame capture rate is one frame every three, four, or five seconds, and wherein the second frame capture rate is at least twice the first frame capture rate.

13. The method of claim 10, wherein the instruction included in the first prompt directs the MLLM to analyze the sequence of messages and a user query represented by the text derived from transcribing the user speech, and to provide details for understanding the intent of the user query.

14. The method of claim 10, wherein the instruction included in the second prompt for use as input with the LLM directs the LLM to generate the response to the user query based on the first output from the MLLM while focusing on extracted details relevant to the user query about objects or actions depicted in the captured frames, and to format the response for appropriate presentation via an output capability of the device.

15. The method of claim 10, wherein outputting the generated response comprises at least one of:

presenting the response visually on a display component of the device;

outputting the response as audio via a speaker of the device; or presenting the response as a combination of visual output on the display component and audio output via the speaker.

16. The method of claim 10, further comprising:

cropping each captured frame to a field of view corresponding to a view of the user, before including the frame as a message in the first prompt.

17. The method of claim 10, wherein constructing the first prompt further comprises: arranging the sequence of messages containing captured frames and corresponding timestamps in chronological order to represent an entire interaction over time.

18. The method of claim 10, wherein the MLLM is constrained to output a maximum of thirty tokens, thereby reducing processing time and focusing the response generated by the MLLM on the most relevant details extracted from the frames in the sequence of messages.

19. A device comprising: means for initiating a multi-frame capture sequence upon detecting user speech obtained via the microphone, by:

capturing, via the at least one camera, a series of frames at a first frame capture rate;

upon detecting a human hand within a frame of the series of frames, increasing a frame capture rate from the first frame capture rate to a second frame capture rate; and terminating the multi-frame capture sequence upon detecting an end of user speech; transcribing the user speech to text;

means for constructing a first prompt for use as input with a multimodal large language model (MLLM), the first prompt comprising an instruction, a sequence of messages with each message containing a captured frame and a corresponding timestamp, and a user query represented by the text derived from transcribing the user speech;

means for transmitting, via the network interface, the first prompt to the MLLM for processing by the MLLM and receiving back a first output; means for constructing a second prompt for use as input with a large language model (LLM), the second prompt comprising an instruction, at least a portion of the first output from the MLLM, and a user query represented by the text derived from transcribing the user speech;

means for transmitting, via the network interface, the second prompt to the LLM for processing by the LLM and receiving back a response; and means for outputting the response.

20. The device of claim 19, further comprising:

means for subjecting each frame captured at the first frame capture rate to a computer vision model trained to detect the presence of a human hand.

* * * * *